(12) United States Patent
Dujardin et al.

(10) Patent No.: US 12,018,756 B2
(45) Date of Patent: Jun. 25, 2024

(54) COMPACT SEAL PACKING TO ENSURE SEALING BETWEEN A ROTARY SHAFT AND A STATIONARY BODY OF A MACHINE

(71) Applicant: CYCLAM, Amiens (FR)

(72) Inventors: Raphaël Dujardin, Saveuse (FR); Jean-Luc Routier, Saint Sauveur (FR)

(73) Assignee: CYCLAM, Amiens (FR)

( * ) Notice: Subject to any disclaimer, the term of this patent is extended or adjusted under 35 U.S.C. 154(b) by 261 days.

(21) Appl. No.: 17/608,841

(22) PCT Filed: May 6, 2020

(86) PCT No.: PCT/EP2020/062618
§ 371 (c)(1),
(2) Date: Nov. 4, 2021

(87) PCT Pub. No.: WO2020/225324
PCT Pub. Date: Nov. 12, 2020

(65) Prior Publication Data
US 2022/0307602 A1 Sep. 29, 2022

(30) Foreign Application Priority Data
May 6, 2019 (FR) ..................................... 1904720

(51) Int. Cl.
*F16J 15/32* (2016.01)
*F16J 15/3212* (2016.01)

(52) U.S. Cl.
CPC ................. *F16J 15/3212* (2013.01)

(58) Field of Classification Search
CPC ...... F16J 15/3212; F16J 15/31; F16J 15/3464; F16J 15/36; F16J 15/3452; F16J 15/348; F16J 15/3484; F16J 15/3488; F16J 15/34
See application file for complete search history.

(56) References Cited

U.S. PATENT DOCUMENTS

| 2,149,974 A | * | 3/1939 | McCormack | ........ | F16J 15/3464 |
| | | | | | 384/142 |
| 4,451,049 A | * | 5/1984 | Charhut | ................... | F16J 15/36 |
| | | | | | 277/374 |

(Continued)

FOREIGN PATENT DOCUMENTS

| DE | 10 2011 107 394 A1 | 1/2013 |
| JP | 60-58897 U | 4/1985 |

OTHER PUBLICATIONS

International Search Report for PCT/EP2020/062618 dated Jun. 24, 2020 (PCT/ISA/210).

(Continued)

*Primary Examiner* — Eugene G Byrd
*Assistant Examiner* — L. Susmitha Koneru
(74) *Attorney, Agent, or Firm* — Sughrue Mion, PLLC

(57) ABSTRACT

The invention relates to a compact seal packing (10), ensuring dynamic sealing between a rotary shaft and a stationary body, in particular a stationary enclosure. In particular, the seal packing (10) comprises a compression spring (16) bearing against a transmission element (18) to transmit the forces of the spring to a friction ring (12) and press it against a counter-ring (14). The compression spring (16) is bearing against a first radial flange (181) of the transmission element (18), a second flange (182) of the transmission element (18) being located partially facing a radial surface (122) of the friction ring distant from the counter-ring (14) and a cylindrical wall (180) of the transmission element (18) being located partially facing the cylindrical outer surface (124) of the friction ring (12).

16 Claims, 1 Drawing Sheet

(56) References Cited

U.S. PATENT DOCUMENTS

| | | | | |
|---|---|---|---|---|
| 4,703,939 A * | 11/1987 | Wentworth | ............ | F16J 15/344 |
| | | | | 277/391 |
| 5,199,719 A * | 4/1993 | Heinrich | ................. | F16J 15/36 |
| | | | | 277/374 |
| 6,145,841 A * | 11/2000 | Maeda | ................... | F16J 15/348 |
| | | | | 277/358 |
| 8,128,097 B2 * | 3/2012 | Yasu | ...................... | F16J 15/348 |
| | | | | 277/358 |
| 9,746,083 B2 * | 8/2017 | Borasso | .............. | F16J 15/3452 |
| 2011/0079961 A1 | 4/2011 | Hoffmann et al. | | |
| 2017/0130845 A1 | 5/2017 | Ziegenbein et al. | | |
| 2020/0200276 A1 * | 6/2020 | Ishihara | .............. | F16J 15/3452 |

OTHER PUBLICATIONS

Written Opinion for PCT/EP2020/062618 dated Jun. 24, 2020 (PCT/ISA/237).

* cited by examiner

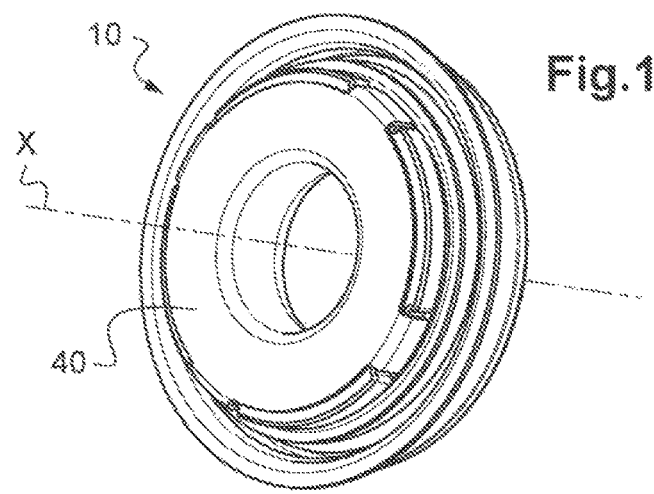
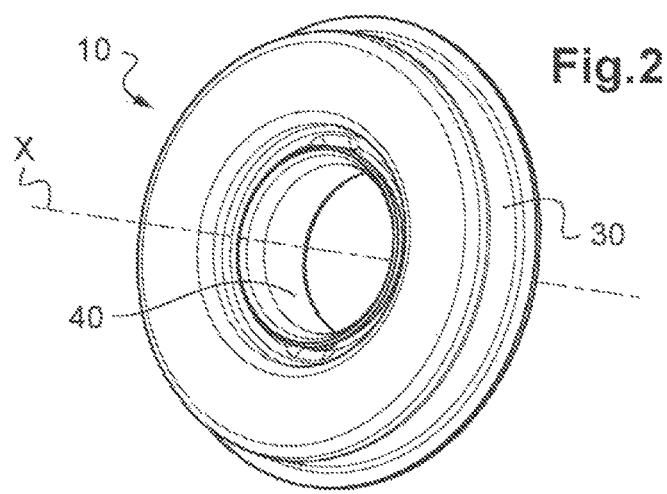
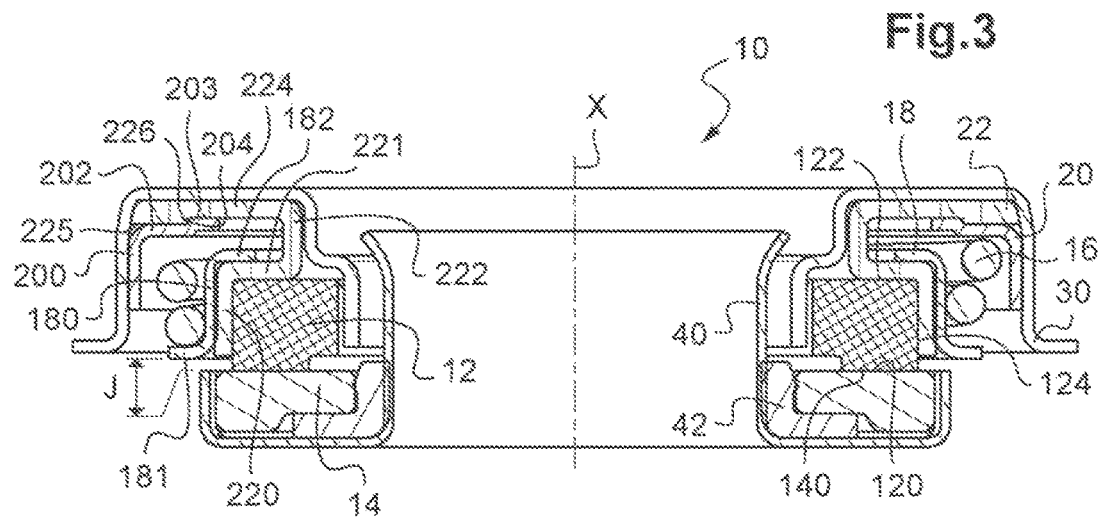

COMPACT SEAL PACKING TO ENSURE SEALING BETWEEN A ROTARY SHAFT AND A STATIONARY BODY OF A MACHINE

CROSS REFERENCE TO RELATED APPLICATIONS

This application is a 371 National Stage of International Application No. PCT/EP2020/062618 filed May 6, 2020, claiming priority based on French Patent Application No. 1904720 filed May 6, 2019, the entire disclosures of which are incorporated by reference herein.

An object of the invention is a seal packing, also called mechanical packing, ensuring dynamic sealing between a rotary shaft and a stationary body, in particular a stationary enclosure.

Such seal packings are used in many rotating machines, such as pumps, stirrers, compressors, gas turbines, centrifuges, refiners, reactors. . . . For example, a pump seal packing is usually positioned between the shaft of the pump and the body of the latter.

In general, this seal packing type comprises a rotating element, also called rotor, connected to the rotating shaft and a fixed element, also called stator, connected to the body of the equipment. Sealing results from the bearing of opposing surface of the rotor and of the stator extending in a radial plane, perpendicular to the axis of the shaft on which the packing is mounted. An element forming a spring accommodated inside the stator usually exerts a pressure on a friction ring internal to the stator in order to push the latter in the direction of the rotor along a direction parallel to the axis of the rotary shaft.

This element forming a spring is often located on the side of the friction ring opposite to the rotor along the axial direction of the shaft. This results in a relatively significant axial bulk of the seal packing.

In some packings, the element forming a spring may be located substantially at the level of the friction ring in a radial plane, as described for example in the document U.S. Pat. No. 91,076,462. However, the packing described in this document has a relatively complex friction ring, the latter having to feature on a cylindrical outer face a step along the radial direction to receive and block an axial movement of a gasket (cf. for example FIG. 6 of this document).

Other packings have a gasket that is sandwiched radially between the friction ring and a portion of the case, as in the documents DE 10 2011 107394A1 and JP360058897U. Such packings require a stringent compliance with the manufacturing tolerances of the different parts in order to ensure sealing while preserving the possibility of slipping of the friction ring. Hence, there is a need to make a seal packing that is compact and easy to make.

To this end, an object of the invention relates to a seal packing intended to ensure sealing between a rotary shaft and a stationary body of a machine, comprising:
 a friction ring having an axis of symmetry X and two surfaces extending radially with respect to the X axis,
 a counter-ring having an axis of symmetry coincident with the X axis and a radial friction surface bearing against one of the radial surfaces of the friction ring,
 a compression spring bearing against a transmission element having an axis of symmetry coincident with the X axis, the transmission element having a cylindrical wall including a first end forming a first radial flange located on the side of the counter-ring and extending in a direction opposite to the X axis and an opposite second end forming a second radial flange extending in the direction of the X axis.

According to the invention, the friction ring has a cylindrical outer surface with an axis X connecting, in particular directly, its two radial surfaces. Furthermore, the compression spring is bearing against the first flange of the transmission element, the second flange of the transmission element being located partially facing the radial surface of the friction ring distant from the counter-ring and the cylindrical wall of the transmission element being located partially facing the cylindrical outer surface of the friction ring, this arrangement enabling the transmission element to cooperate with the friction ring to transmit thereto the forces exerted by the compression spring.

This particular arrangement of the transmission element allows reducing the axial bulk of the seal packing. Indeed, the compression spring thus extends at least partially at the cylindrical portion of the friction ring, the force transfer resulting from the cooperation of the second flange and of the cylindrical portion of the transmission element with the friction ring and allowing for a proper transmission of the forces exerted by the spring to the friction ring despite the advanced position of the compression spring in the direction of the counter-ring. Furthermore, the friction ring having a unique cylindrical outer surface extending continuously from one radial surface to another could be made in a particularly simple manner.

Advantageously, the cylindrical wall of the transmission element may extend over more than half, for example over more than two thirds, of the length of the cylindrical outer surface of the friction ring along the direction of the X axis. Thus, an arrangement that is particularly compact axially is obtained.

Advantageously, the first flange of the transmission element may be distant from the friction surface of the counter-ring, along the X axis, by a predetermined clearance. In particular, for example, this clearance may be selected so that the first flange could not come into contact with the counter-ring during the use of the seal packing.

Advantageously, the transmission element may be made in one-piece, in particular of metal or alloy, in particular a metal-based one such as a steel, for example of stainless steel. Making in one-piece allows facilitating making of the part and increasing its resistance, notably to frictions, in particular when the used material is a metal or an alloy, notably an alloy containing one or several metal(s). Thus, the transmission element serves both as a supporting ring for the compression spring and as a force transmission element.

Advantageously, the seal packing may comprise a supporting ring of the compression spring, this supporting ring having a cylindrical portion with an axis X located at least partially facing the cylindrical portion of the transmission element, in particular with a diameter larger than the diameter of the latter, and a radial portion extending in the direction of the X axis, facing the first flange of the transmission element. Such an arrangement allows reducing the bulk of the seal packing. Thus, the supporting ring and the transmission element define a room for the compression spring between their surfaces.

Advantageously, the seal packing may comprise a secondary sealing element extending partially between the transmission element and the friction ring, in particular between the cylindrical wall and the second radial flange directed towards the X axis of the transmission element and the surfaces facing the friction ring.

In particular, the seal packing may comprise a case accommodating the friction ring, the transmission element, the compression spring and the secondary sealing element.

Advantageously, the secondary sealing element may extend partially between the supporting ring and this case. Preferably, the portion of the secondary sealing element extending between the supporting ring and the case extends only between the radial portion of the supporting ring and the case, preferably also between the supporting ring and the case on the side of the X axis. The secondary sealing element does not then extend between the cylindrical portion of the supporting ring and the case, which allows limiting the bulk of the seal packing according to the invention along a direction perpendicular to the X axis.

Thus, the secondary sealing element extends partially between the transmission element and the friction ring and partially between the supporting ring and the case accommodating the friction ring, the transmission element, the compression spring and the secondary sealing element. The compression spring bearing against the transmission element and the supporting ring, the force exerted by the spring compresses the secondary sealing element against the friction ring and the case and thus achieves both sealing and the possibility of slipping of the friction ring. This arrangement has the advantage of not requiring stringent tolerances for making the friction ring, the case, the transmission element and the supporting ring, thereby simplifying making of the seal packing.

Advantageously, for a better sealing, the portion of the secondary sealing element extending between the transmission element and the friction ring and the portion of the secondary sealing element extending between the supporting ring and the case accommodating the friction ring may be connected by a cylindrical portion located on the side of the X axis, extending in particular between the supporting ring and the transmission element on the one hand and the case on the other hand. For a simple making, this secondary sealing element may be made in one-piece.

Advantageously, radial surfaces in contact with the sealing element and with the supporting ring may have complementary steps along the direction of the X axis blocking their relative movement along a direction perpendicular to the X axis. This allows improving holding thereof in an assembled state and participating in sealing of the whole.

The seal packing may include a compression coil spring which could be cylindrical or conical shaped, preferably conical shaped. In the latter case, it is the end of the spring with the smaller diameter that is preferably bearing against the first flange of the transmission element.

The invention allows obtaining a seal packing that is particularly compact along the X axis.

Advantageously, the dimension of the transmission element along the X axis may thus represent 30% or more of the overall dimension of the packing in this same direction, in particular from 30 to 70% of this overall dimension, preferably from 30 to 60% of this overall dimension.

Advantageously, the dimension of the friction ring along the X axis may represent 75% or less of the overall dimension of the packing in this direction, in particular from 35 to 75% of the overall dimension, preferably from 35 to 65%. These dimensions may be combined with any one of the dimensions of the transmission element, the preferred ranges forming a preferred embodiment.

The overall dimension of the packing along the X axis corresponds to the overall dimension when considering all elements of the packing in an assembled state.

Advantageously, this assembled state may result from crimping of the case accommodating the friction ring, the transmission element, the compression spring and the secondary sealing element with a sleeve accommodating the counter-ring and a ring forming a gasket and a blocking element for the counter-ring and disposed between the latter and the sleeve. In particular, this crimping could be done on the side of the X axis.

The seal packing according to the invention may be used in many rotating machines comprising a rotary shaft.

Thus, the invention also relates to a rotating machine including a stationary body and a rotary shaft equipped with a seal packing according to the invention. The counter-ring is then mounted secured in rotation with shaft, the friction ring, the transmission element and the compression spring being fixed, mounted secured to the stationary body.

The invention is now described with reference to the non-limiting appended drawings, wherein:

FIG. 1 shows a perspective view of a face of a seal packing according to an embodiment of the invention.

FIG. 2 shows a perspective view of the other face of the seal packing of FIG. 1.

FIG. 3 shows a sectional view of the seal packing shown in FIGS. 1 and 2.

By radial plane, it should be understood a plane extending perpendicularly to the axis of symmetry X defined in the present description.

In the present description, when an element is qualified as "radial", it should be understood that it extends in a radial plane.

FIGS. 1 to 3 show a seal packing 10 intended to ensure sealing between a rotary shaft and a stationary body of a machine (not shown in the figures), for example a pump. Thus, such a seal packing 10 is designed so as to be able to be fitted along an axis X on the rotary shaft of a machine. Thus, most of the elements of a seal packing of this type have a symmetry, in particular an axisymmetry, with respect to this X axis. In the figures, the X axis of the seal packing 10 is coincident with the axis of the rotary shaft when the seal packing 10 is mounted on this shaft.

In particular, the seal packing 10 comprises a friction ring 12, a counter-ring 14, a compression spring 16 and a transmission element 18. The compression spring 16 pushes the friction ring 12 in the direction of the counter-ring 14 along the direction of the X axis thus ensuring bearing of the friction ring 12 against the counter-ring 14 and sealing of the whole.

The friction ring 12, with an axis of symmetry X, has two surfaces 120, 122 extending radially with respect to the X axis. These surfaces 120, 122 are called radial surfaces in the following description. They are connected, herein directly, by a cylindrical outer surface 124 with an axis X of the friction ring 12. In other words, as shown clearly in FIG. 3, the shape of the friction ring 12 is particularly simple, with a unique cylindrical outer surface 124 connecting the two opposite radial surfaces 120, 122. The friction ring is made of a wear-resistant material, for example based on a synthetic carbon (graphite carbon), a special steel or a material such as a carbide (tungsten carbide, silicon carbide or the like) or a metallic oxide (aluminum oxide).

The counter-ring 14, with an axis of symmetry X, has a radial friction surface 140 bearing against the radial surface 120 of the friction ring 12. The radial surfaces 120, 122, 140 are herein ring-like shaped. The counter-ring is also made of a wear-resistant material, of the same type as that used for the friction ring.

The transmission element 18 has a cylindrical wall 180 with an axis of symmetry X. One of the ends of this cylindrical wall 180 forms a first radial flange 181 located on the side of the counter-ring 14 extending in a direction opposite to the X axis, the other end of the cylindrical wall 180 forming a second radial flange 182 extending in the direction of the axis X. In the example, the first and second flanges 181, 182 are thus ring-like shaped.

The compression spring 16, in particular one of its ends, is bearing against the transmission element 18, the latter cooperating with the friction ring 12 to transmit the forces exerted by the compression spring 16 thereto. In particular, the seal packing 10 according to the invention is arranged so that:
- the second flange 182 of the transmission element 18 is located partially facing the radial surface 122 of the friction ring 12 distant from the counter-ring 14, and
- the cylindrical wall 180 of the transmission element 18 is located partially facing the cylindrical outer surface 124 of the friction ring 12.

This particular arrangement promotes the transmission of the forces of the compression spring 16 to the friction ring 12, and that being so despite the fact that the compression spring extends partially around the friction ring 12.

In the example, it should be noted that the cylindrical wall 180 of the transmission element 18 extends over more than half, in particular over more than two thirds, of the length of the cylindrical outer surface 124 of the friction ring 12 along the direction of the X axis. More specifically, herein the first flange 181 of the transmission element 18 is distant from the friction surface 140 of the counter-ring 14, along the X axis, by a predetermined clearance J. This clearance may be a sufficient clearance such that, when the seal packing is mounted on a rotary shaft, the friction ring and the counter-ring are in contact but the first flange 181 and the counter-ring 14 never come into contact regardless of the rotational speed of the shaft. Thus, such a clearance can be determined by a person skilled in the art according to the conditions of use of the seal packing.

In the example shown, the transmission element 18 is made in one-piece, herein of metal or alloy, preferably of stainless steel. The use of resistant materials, in particular metal-based, allows reducing the wear of the transmission element 18 due to frictions, in particular upon the action of the spring. It is not then necessary to provide for an additional part between the transmission element 18 and the compression spring 16, the latter may be bearing directly against the transmission element 18. A suitable material, in particular a stainless steel, for example containing chromium and titanium, also allows a distribution of the point forces exerted by the different portions of the spring.

As shown in the figures, the shown seal packing 10 further comprises a supporting ring 20 of the compression spring 16, more specifically of the other end of the compression spring 16. This supporting ring 20 has a cylindrical portion 200 with an axis X and a radial portion 202 extending in the direction of the X axis. It should be noted that the cylindrical portion 200 is located partially facing the cylindrical portion 180 of the transmission element 18, while the radial portion 202 extends facing the first flange 181 of the transmission element 18. The supporting ring 20 may be made of a metal-based alloy, in particular a stainless steel, for example based on chromium and titanium.

In the example shown, the compression spring 16 is a conical-shaped coil spring, whose end with a smaller diameter is bearing against the first flange 181 of the transmission element 18 while its end with a larger diameter is bearing against the supporting ring 20. Nonetheless, the invention is not limited to the use of a conical spring, a cylindrical spring may be considered. Nonetheless, a conical spring allows exerting more linear forces on the friction ring.

The seal packing 10 shown in the figures further comprises a secondary sealing element 22 extending partially between the transmission element 18 and the friction ring 12. In particular, this secondary sealing element 22 ensures a static sealing. For example, it is made of a polymer material, in particular an elastomer-type one.

As shown, the friction ring 12, the transmission element 18, the compression spring 16, but also the supporting ring 20 as well as the secondary sealing element 22 are accommodated inside a case 30 of the seal packing 10. This case 30 is intended to be securely fastened to the stationary body of the rotating machine on which the seal packing 10 should be installed. In other words, the case 30, as well as all of its constituents, are fixedly mounted inside the machine. Thus, the case 30 features an X-axis symmetry. It is open in the direction of the counter-ring 14.

As shown in the figures, the secondary sealing element 22 also extends partially between the supporting ring 20 and the case 30. In order to reduce further the bulk of the seal packing 10, the secondary sealing element 22 herein extends only between the radial portion 202 of the supporting ring 20 and the case 30. Such an arrangement could allow holding a conical spring without increasing the outer diameter of the seal packing, or while limiting the increase thereof. It also allows reducing the amount of material needed to make the secondary sealing element 22.

In the example shown, this secondary sealing element 22 comprises, in particular only:
- a first cylindrical wall 220 with an axis X located between the cylindrical wall 180 of the transmission element 18 and the outer cylindrical surface 124 of the friction ring 12, against these,
- a second radial wall 221 extending from the first wall 220 in the direction of the X axis bearing against the surface 122 of the friction ring distant from the counter-ring 14,
- a third cylindrical wall 222 with an axis X extending from the second wall 222 in a direction opposite to the counter-ring 14,
- a fourth radial wall 224 extending in a direction opposite to the X axis from the third wall 223.

In the example shown, it should finally be noted that the secondary sealing element 22 includes a radial surface 225 in contact against a radial surface 203 of the supporting ring 20, these radial surfaces 225, 203 having complementary steps (226, 204 respectively) along the direction of the X axis thereby blocking their relative movement along a direction perpendicular to the X axis.

Moreover, in the example shown, in a common manner, the counter-ring 14 is accommodated inside a sleeve 40 intended to be securely fastened in rotation to the rotary shaft of the machine. Furthermore, this sleeve 40, with an axis of symmetry X, receives a ring 42 serving both as a gasket and as a blocking element of the counter-ring 14. This ring 42 may be made of a material similar to that used for the secondary sealing element 22.

This sleeve 40 is assembled to the case 30, for example by crimping. Here, cylindrical walls of the sleeve and of the case, on the inner side (close to the X axis) and facing one another radially, are crimped.

The seal packing according to the invention has the advantage of being radially and axially compact, the compression spring extending in particular partially around the friction ring, between the latter and the case.

The invention claimed is:

1. A seal packing intended to ensure sealing between a rotary shaft and a stationary body of a machine, comprising:
    a friction ring having an axis of symmetry X and two surfaces extending radially with respect to the X axis,
    a counter-ring having an axis of symmetry coincident with the X axis and a radial friction surface bearing against one of the radial surfaces of the friction ring,
    a compression spring bearing against a transmission element having an axis of symmetry coincident with the X axis, the transmission element having a cylindrical wall including a first end forming a first radial flange located on the side of the counter-ring and extending in a direction opposite to the X axis and an opposite second end forming a second radial flange extending in the direction of the X axis,
    characterised in that the friction ring has a cylindrical outer surface with an axis X connecting, in particular directly, its two radial surfaces and in that the compression spring is bearing against the first flange of the transmission element, a length of the second radial flange of the transmission element being located partially overlapping a length of the radial surface of the friction ring distant from the counter-ring such that the second radial flange faces the radial surface of the friction ring distant from the counter-ring and the cylindrical wall of the transmission element being located partially facing the cylindrical outer surface of the friction ring, and in that the seal packing further comprises:
    a supporting ring of the compression spring, this supporting ring having a cylindrical portion with an axis X being located with a length of the cylindrical portion at least partially overlapping a length of the cylindrical wall of the transmission element such that the cylindrical portion faces the cylindrical wall of the transmission element and a radial portion extending in the direction of the X axis, facing the first flange of the transmission element, and
    a secondary sealing element extending partially between the transmission element and the friction ring and partially between the supporting ring and a case accommodating the friction ring, the transmission element, the compression spring and the secondary sealing element.

2. The seal packing according to claim 1, characterised in that the cylindrical wall of the transmission element extends over more than half of the length of the cylindrical outer surface of the friction ring along the direction of the X axis.

3. The seal packing according to claim 1 or, characterised in that the first flange of the transmission element is distant from the friction surface of the counter-ring, along the X axis, by a predetermined clearance.

4. The seal packing according to claim 1, characterised in that the transmission element is made in one-piece of metal or alloy.

5. The seal packing according to claim 1, characterised in that the portion of the secondary sealing element extending between the supporting ring and the case extends only between the radial portion of the supporting ring and the case, optionally also between the supporting ring and the case on the side of the X axis.

6. The seal packing according to claim 1, characterised in that the portion of the secondary sealing element extending between the transmission element and the friction ring and the portion of the secondary sealing element extending between the supporting ring and the case are connected by a cylindrical portion located on the side of the X axis, extending between the supporting ring and the transmission element on the one hand and the case on the other hand.

7. The seal packing according to claim 1, characterised in that the secondary sealing element is made in one piece.

8. The seal packing according to claim 1, characterised in that radial surfaces in contact with the secondary sealing element and with the supporting ring have complementary steps along the direction of the X axis blocking their relative movement along a direction perpendicular to the X axis.

9. The seal packing according to claim 1, characterised in that the compression spring is a cylindrical coil spring.

10. The seal packing according to claim 1, characterised in that the compression spring is a conical coil spring.

11. The seal packing according to claim 1, characterised in that the dimension of the transmission element along the X axis represents 30% or more of the overall dimension of the packing in this same direction.

12. The seal packing according to claim 1, characterised in that the dimension of the friction ring along the X axis represents 75% or less of the overall dimension of the packing in this direction.

13. The seal packing according to claim 1, characterised in that it further comprises a sleeve accommodating the counter-ring and a ring forming a gasket and blocking element for the counter-ring and disposed between the latter and the sleeve, and in that the sleeve is crimped to the case.

14. A rotating machine including a stationary body and a rotary shaft equipped with a seal packing according to claim 1.

15. The seal packing according to claim 2, characterised in that the cylindrical wall of the transmission element extends over more than two thirds of the length of the cylindrical outer surface of the friction ring along the direction of the X axis.

16. The seal packing according to claim 1, characterised in that the cylindrical outer surface of the friction ring has a constant diameter along the direction of the X axis.

* * * * *